United States Patent [19]
Chen

[11] Patent Number: 6,060,844
[45] Date of Patent: May 9, 2000

[54] METHOD AND APPARATUS OF AN IMPROVED ELECTRONICS BALLAST CIRCUIT

[75] Inventor: Hong-Cheng Chen, Palo Alto, Calif.

[73] Assignee: LapLaz Lighting Co., San Francisco, Calif.

[21] Appl. No.: 09/094,238

[22] Filed: Jun. 9, 1998

[51] Int. Cl.[7] ................................................ G05F 1/00
[52] U.S. Cl. .......................... 315/307; 315/224; 315/247; 315/219
[58] Field of Search ..................... 315/224, 247, 315/307, 291, 209 R, DIG. 5, 244, 219

[56] References Cited

U.S. PATENT DOCUMENTS

| | | | |
|---|---|---|---|
| 3,913,002 | 10/1975 | Steigerwald et al. | 315/247 |
| 5,048,033 | 9/1991 | Donahue et al. | 315/291 |
| 5,363,020 | 11/1994 | Chen et al. | 315/307 |
| 5,371,440 | 12/1994 | Liu et al. | 315/224 |
| 5,387,848 | 2/1995 | Wong | 315/224 |
| 5,412,286 | 5/1995 | Kazi et al. | 315/242 |
| 5,428,633 | 6/1995 | Hiroshima | 315/307 |
| 5,465,029 | 11/1995 | Hanazaki et al. | 315/207 |
| 5,585,700 | 12/1996 | Ahmed | 315/307 |
| 5,621,279 | 4/1997 | Nilssen | 315/247 |
| 5,654,611 | 8/1997 | Yamamoto et al. | 315/224 |
| 5,691,606 | 11/1997 | Moisin et al. | 315/307 |

*Primary Examiner*—Haissa Philogene
*Assistant Examiner*—Wilson Lee
*Attorney, Agent, or Firm*—Majestic, Parsons, Siebert & Hsue P.C.

[57] ABSTRACT

A ballast circuit adaptive to changes in the input voltages capable of providing a "floating" high output voltage for the operation of fluorescent lamps. The present invention employs an output voltage "floating" design in adjusting the voltage gain of the ballast circuit in response to the voltage difference between the output voltage and the rectified input voltage (i.e. error voltage).

6 Claims, 6 Drawing Sheets

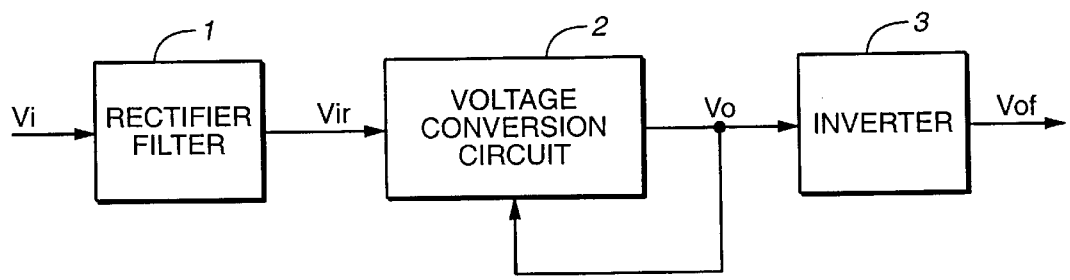
FIG._1
(PRIOR ART)
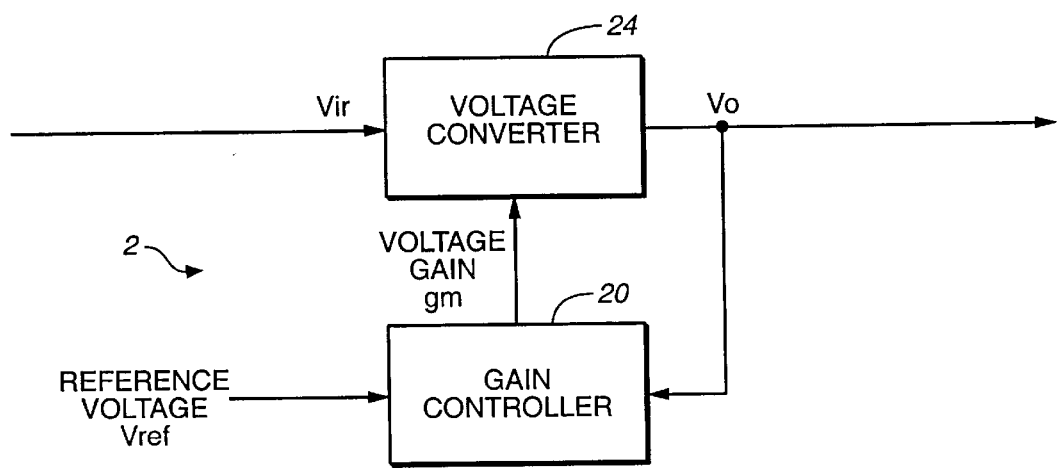
FIG._2
(PRIOR ART)

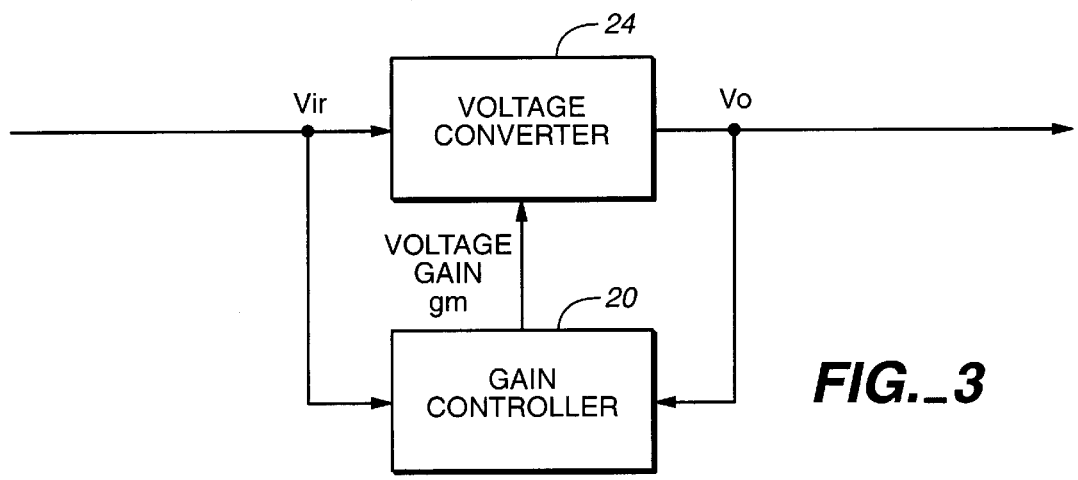
FIG._3
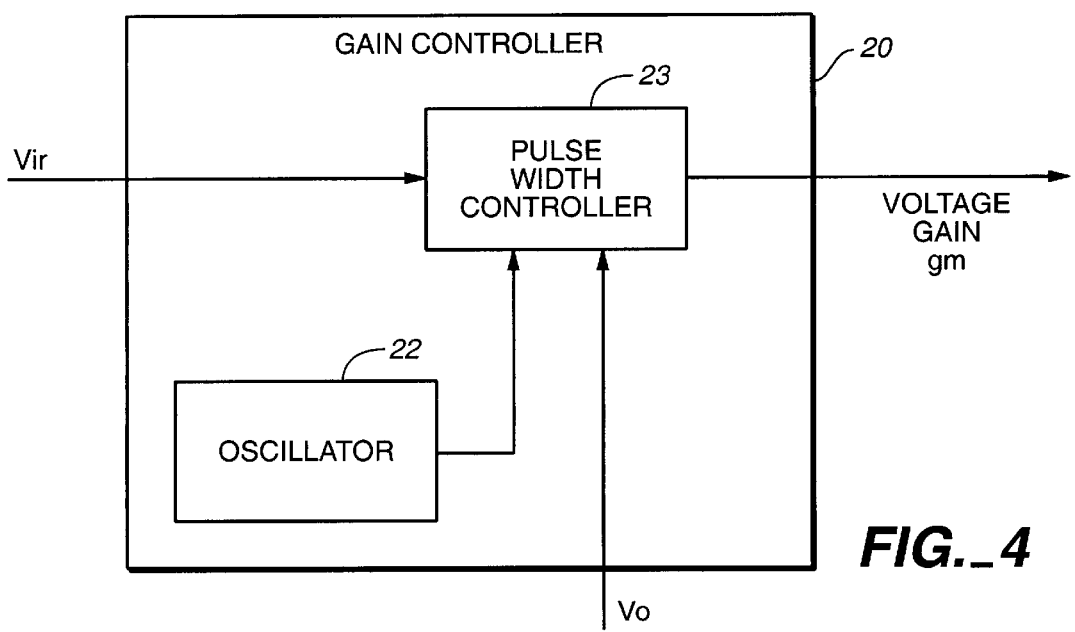
FIG._4

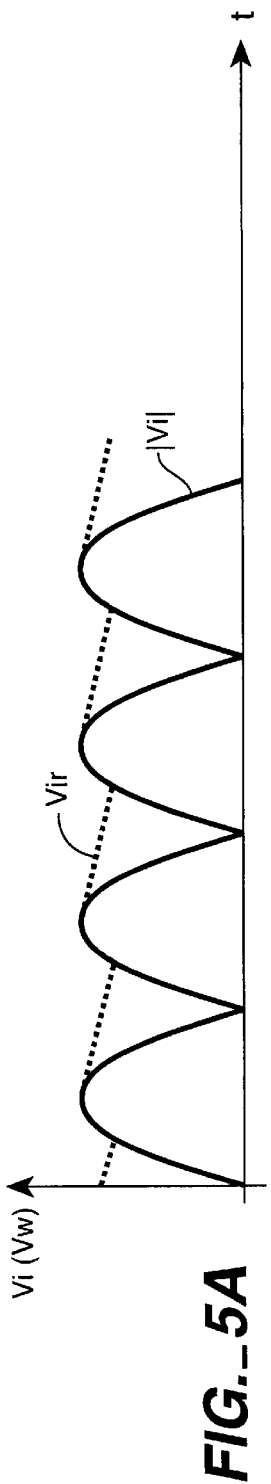
FIG._5A
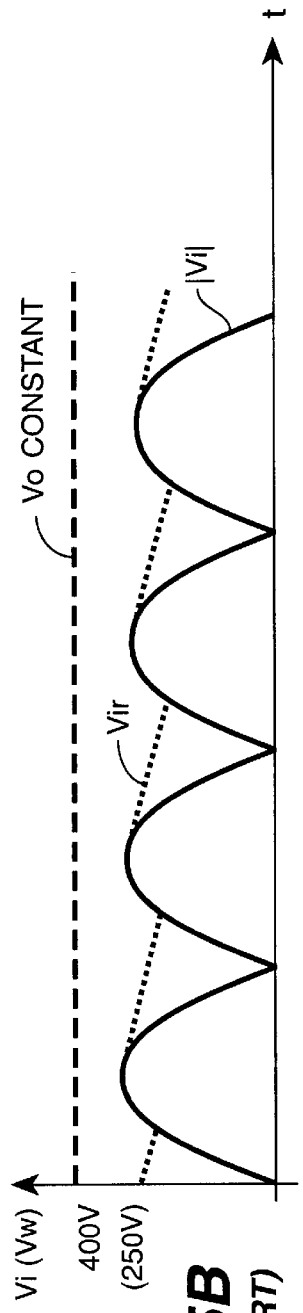
FIG._5B
(PRIOR ART)
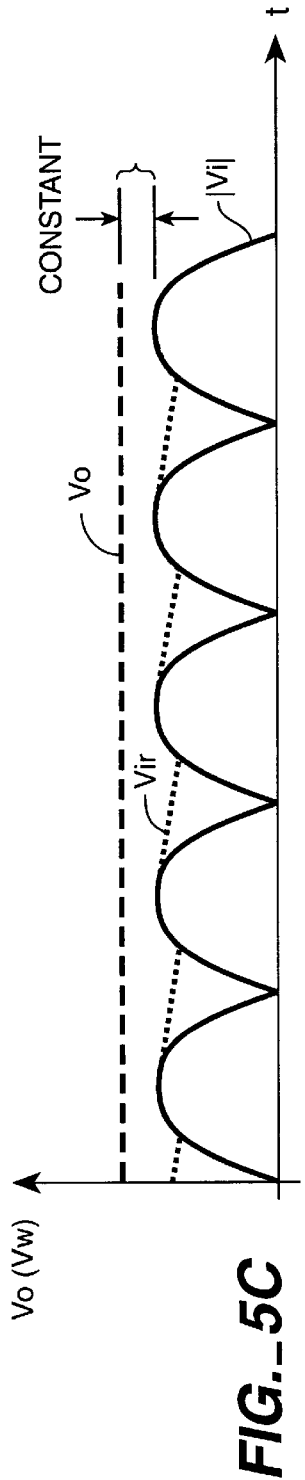
FIG._5C

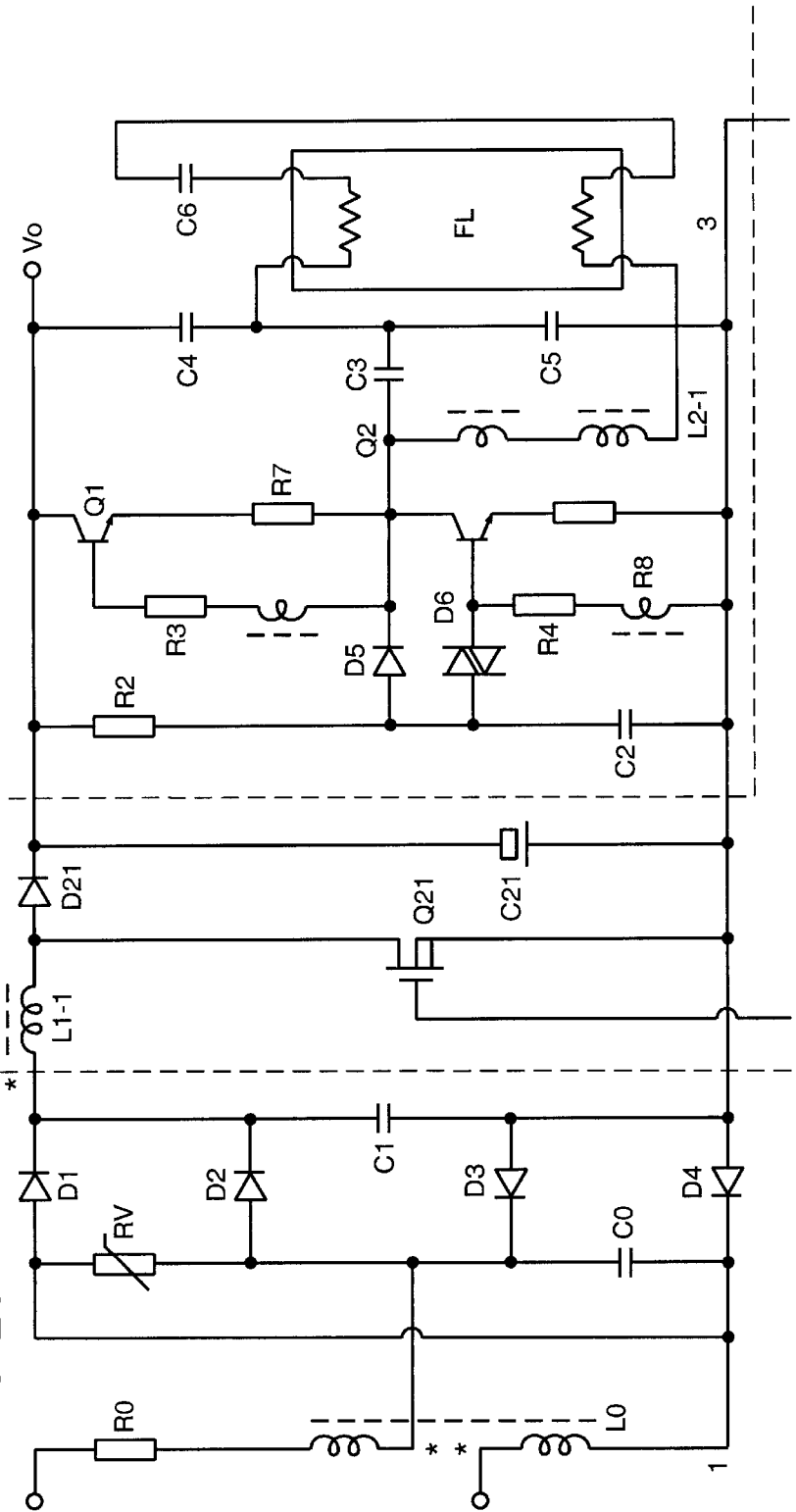

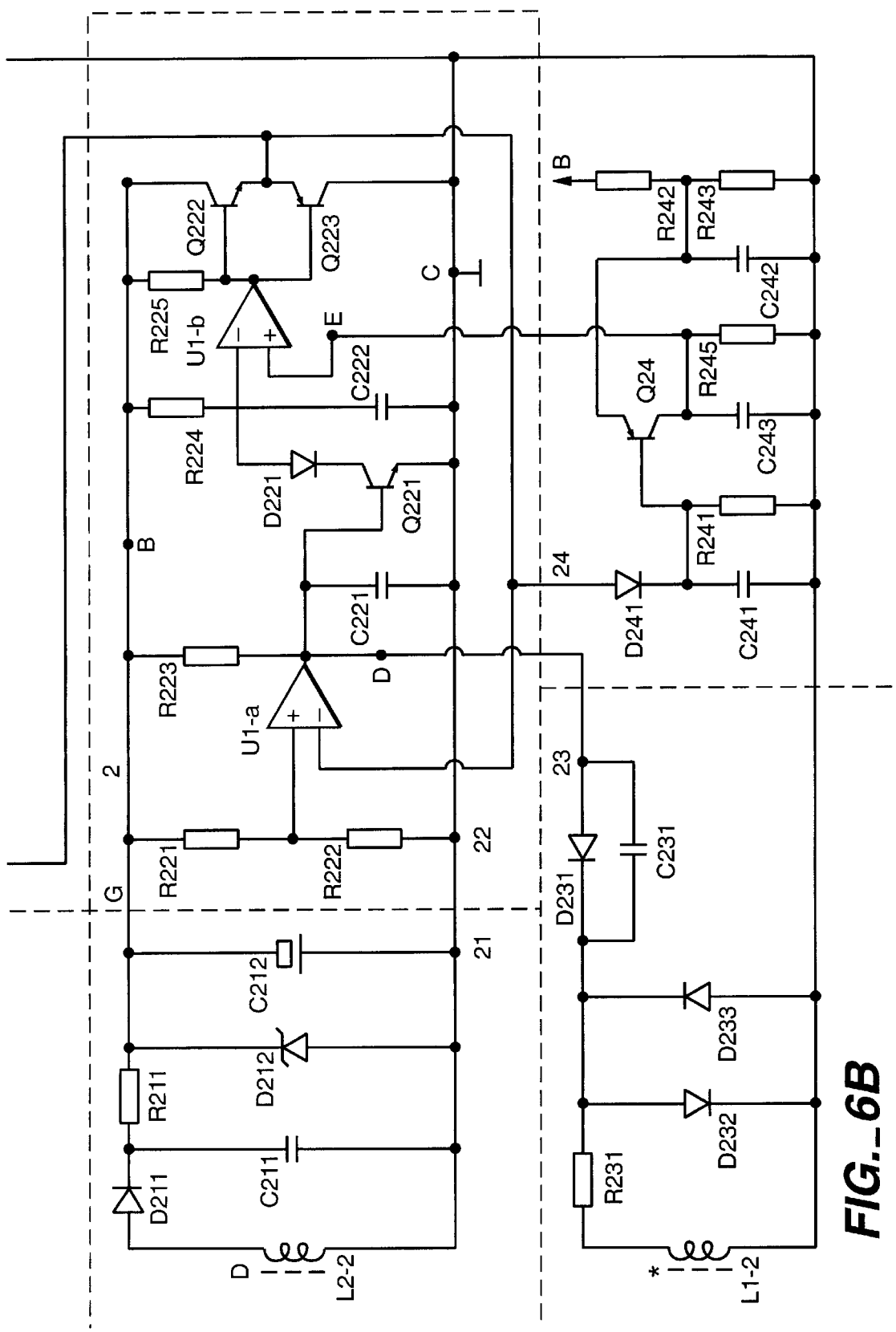
FIG._6B

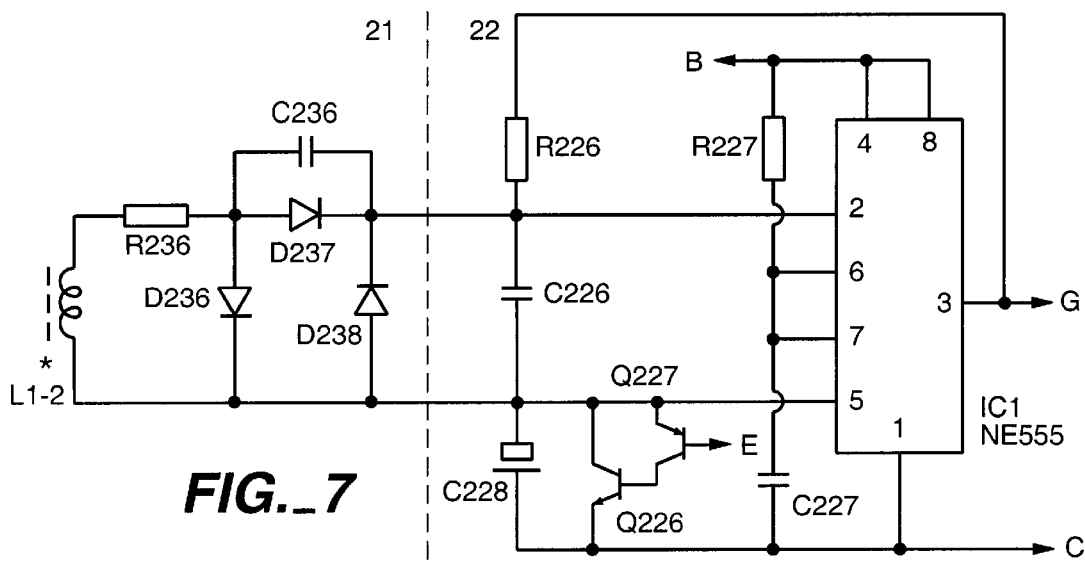
FIG._7
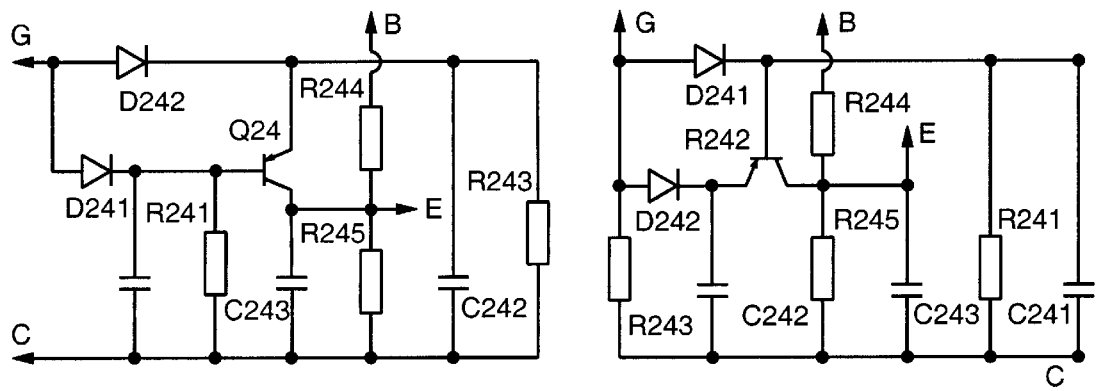
FIG._8  FIG._9
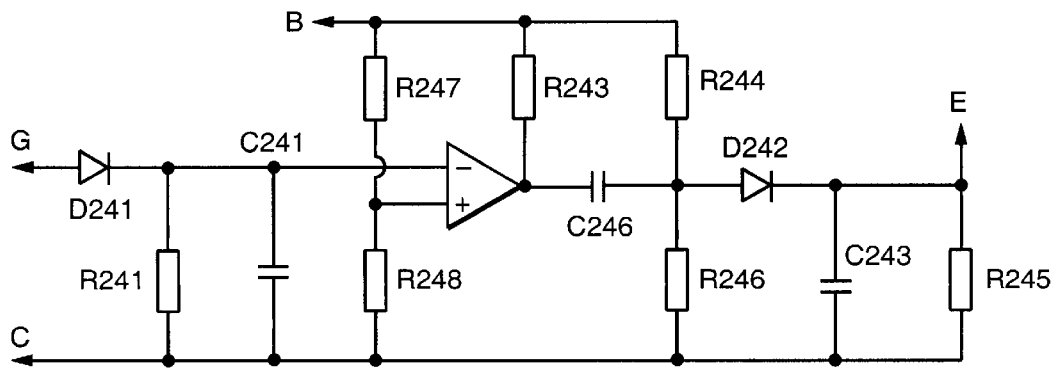
FIG._10

METHOD AND APPARATUS OF AN IMPROVED ELECTRONICS BALLAST CIRCUIT

BACKGROUND OF THE INVENTION

The present invention relates to a ballast circuit for fluorescent lamps. More particularly, the present invention relates to a highly efficient ballast circuit adaptive to changes in the input voltages.

Fluorescent lamps are becoming increasingly popular for use in homes or offices because of their high operating efficiency as compared to incandescent lamps. Indeed, fluorescent lamps emit light at several times the efficiency of a typical incandescent lamp, and do not generate as much heat as a typical incandescent bulb, thereby conserving radiant energy and eliminating excess heat output.

A typical fluorescent lamp is constructed from a glass tube which contains two electrodes at opposite ends, a coating of powdered phosphor covering the interior of the tube, and small amounts of mercury. The major components of a fluorescent lamp are the bulb, electrodes, fill gas, phosphor coating and a base used to support the external conductors of the electrodes. When energized, the electrodes produce a large potential between which free electrons initiate an arc. The arc generates some visible radiation, but mostly ultraviolet radiation, which in turn excites the phosphor coating causing it to emit light. In this process, the fluorescent effect is caused by the excited mercury vaporized in the arc.

Larger fluorescent systems are well known and have involved larger scale, well known illumination electronics which have been optimized to one degree or another over the years. A variety of techniques are developed for optimizing these larger fluorescent systems such as to eliminate flicker; provide light which is suitable for reading and working, and provide adequate lighting in large industrial facilities, etc.

As fluorescent lighting has gained acceptance for increasingly less formal and consequently smaller uses, the sizes of the fluorescent lamps and their systems have become smaller. The reduced scale of the fluorescent lights cannot generally be accomplished with a simple size reduction in the circuit elements. Care must be taken to re-design the operating electronics to insure first that a size reduction is achieved, and second that the higher power efficiency is preserved in the smaller size lamps. This is especially important because it is the power efficiency which generated the interest in the use of fluorescent lighting initially.

In a conventional fluorescent lamp design, a ballast circuit is required for providing a high and constant voltage to operate the fluorescent lamp. In addition to the high voltage requirement, the ballast circuit is required to maintain a constant current flowing to the lamp. It is well known in the art to use a close-loop feedback design to control the ballast circuit for providing a constant high output voltage and current.

FIG. 1 shows a conventional design of a ballast circuit. In the ballast circuit as shown, an input voltage Vi is provided to a rectifier 1. The rectified input voltage Vir is then fed into a voltage conversion circuit 2 for generating an output voltage Vo higher than the rectified input voltage Vir. The voltage inverter 3 then converts the high output voltage Vo to a high frequency output voltage Vof for the fluorescent lamp operation.

FIG. 2 shows a voltage conversion circuit 2 of the conventional close-loop feedback design. The voltage conversion circuit 2 comprises a voltage converter 24 for amplifying the rectified input voltage Vir to the high output voltage Vo; and a gain controller 20 for controlling the voltage gain for the voltage converter 24. In the conventional close-loop feedback design, the voltage gain of the voltage converter 24 is inversely proportional to the voltage difference between the output voltage Vo and a reference voltage Vref to ensure the output voltage Vo to be constant notwithstanding changes in the rectified input voltage Vir. Usually, the output voltage Vo is designed to be around 180 to 250 volts when the input voltage is 110 volts. However, there are two problems facing the conventional close loop feedback ballast circuit design.

First, when the input voltage is low, the conventional ballast circuit needs to perform a large amount of energy conversion to maintain a constant high voltage. However, the more energy conversion is performed, the more self-loss is from the ballast circuit. Therefore, the conventional close loop feedback design suffers from low operating efficiency when the input voltage is too low.

The second problem facing the conventional design is high output sensitivity to the electronic components used. In the conventional ballast circuit, the high output voltage is typically controlled by resister sampling and stabilizing power source technologies. These techniques are both highly sensitive to component accuracies. Therefore, higher grade components are needed for the conventional design and thereby the cost of volume manufacturing of the conventional ballast circuits is prohibitive.

SUMMARY OF THE INVENTION

It is therefore the object of this invention to provide an electronic ballast circuit for use with fluorescent lamps which is low cost and high efficiency.

It is another object of the present invention to provide an electronic ballast circuit capable of self tuning to the variations in the input voltage.

It is yet another object of the present invention to provide an electronic ballast circuit having lower electronic components sensitivity.

In order to accomplish the abovementioned objects, the present invention discloses a ballast circuit having a voltage conversion circuit that is able to convert a low input voltage to a high output voltage. Specifically, the voltage conversion circuit performs the voltage conversion in response to the voltage difference between the high voltage output and the rectified input voltage (i.e. an error voltage).

In a preferred embodiment, the present invention employs a novel "floating" output voltage design that maintains the error voltage (i.e. voltage difference between the output voltage Vo and the rectified input voltage Vir) substantially constant. By "floating" the output voltage with respect to the rectified input voltage, the present invention achieves a high power factor (i.e. >95%) while being able to reduce the output sensitivity on the electronic components used.

These and other objects and features of the invention will be better understood by reference to the detailed description which follows taken together with the drawings in which like elements are referred to by like designations throughout the several views.

BRIEF DESCRIPTION OF THE DRAWINGS

FIG. 1 shows a block diagram of a ballast circuit for fluorescent lamps;

FIG. 2 shows a block diagram of a voltage conversion circuit of a conventional design;

FIG. 3 shows a block diagram of a voltage conversion circuit of the present invention;

FIG. 4 shows a block diagram of a gain controller of the present invention;

FIGS. 5a, 5b, and 5c are timing diagrams showing the operation of the conventional design and a preferred embodiment of the present invention;

FIG. 6 shows a schematic diagram of a preferred embodiment of the present invention;

FIG. 7 shows a schematic diagram of another preferred embodiment of an the present invention;

FIG. 8 shows a schematic diagram of another preferred embodiment of a pulse width controller of the present invention;

FIG. 9 shows a schematic diagram of yet another preferred embodiment of the pulse width controller of the present invention;

FIG. 10 shows a schematic diagram of a voltage converter of the present invention.

DETAILED DESCRIPTION OF THE PREFERRED EMBODIMENT

FIG. 1 shows a block diagram for a conventional ballast circuit used for providing a high voltage for the operation of fluorescent lamps. The ballast circuit comprises three components: a rectifier for converting an input voltage Vi to a rectified input voltage Vir; a voltage conversion circuit 2 for converting the rectified input voltage Vir to a high output voltage Vo, and an inverter 3 for inverting the high output voltage Vo to a high frequency output voltage Vof. In the ballast circuit as shown in FIG. 1, a conventional close loop feedback design is used for maintaining the high output voltage Vo constant by feeding the output voltage Vo back to the gain controller 20. By feeding the output voltage back to the gain controller 20, the gain controller can compensate voltage fluctuations on the rectified input voltage Vir by adjusting the voltage gain gm so that the output voltage Vo will remain constant.

FIG. 2 shows a conventional design of the voltage conversion circuit 2. The voltage conversion circuit 2 as shown comprises a voltage converter 24 for converting the rectified input voltage Vir to the high output voltage Vo; and a gain controller 20 for controlling the voltage gain gm provided to the voltage converter 24. In the conventional close loop feedback design, the gain controller 20 compares the output voltage Vo with a reference voltage Vref and then adjusts the voltage gain gm of the voltage converter 24 accordingly. For the feedback design as shown in FIG. 1, the voltage gain gm is inversely proportional to the voltage difference between the output voltage Vo and the reference voltage Vref so that when the output voltage Vo increases, the voltage gain gm will be decreased accordingly in order to maintain a constant output voltage Vo.

In some ballast circuit designs, the voltage gain gm provided to the voltage converter 24 is embedded in a sequence of square pulses generated by the gain controller 20. The voltage gain gm is usually represented by an off period width Toff of the sequence of square pulses (i.e. Toff is the time when voltage is low). The rectified input voltage Vir is then amplified by the voltage converter 24 in response to the off period width Toff of the sequence of square pulses. To maintain a constant high output voltage Vo for this close-loop feedback design, the gain controller 20 then adjusts the off period width Toff (representing the voltage gain gm) according to the voltage difference between the output voltage Vo with the reference voltage Vref. For example, if the voltage difference between the output voltage Vo and the reference voltage Vref increases, the voltage gain gm for the next pulse cycle will be reduced. On the other hand, if the voltage difference between the output voltage Vo and the reference voltage Vref decreases, the voltage gain gm for the next pulse cycle will be increased accordingly.

FIG. 3 shows a block diagram of the voltage conversion circuit 2 of a preferred embodiment of the present invention. The voltage conversion circuit 2 comprises two components: a voltage converter 24 for converting the rectified input voltage Vir to the high output voltage Vo; and a gain controller 20 for controlling the voltage gain gm of the voltage converter 24. In the present invention, instead of comparing the output voltage Vo with a fixed reference voltage Vref, the voltage conversion circuit 2 employs a "floating" output voltage design so that the gain controller 20 is responsive to the voltage difference between the output voltage Vo and the rectified input voltage Vir (i.e. error voltage). By controlling the voltage gain gm in response to the voltage difference between the output voltage Vo and the rectified input voltage Vir, the output voltage Vo "floats" along with the rectified input voltage Vir. Specifically, the voltage difference between the output voltage Vo and the rectified input voltage Vir is maintained substantially constant. Therefore, the range of the voltage amplification by the voltage converter 24 is thereby limited. Instead of attempting to maintain a high output voltage Vo when the rectified input voltage Vir is low, the present invention avoids a high voltage amplification by floating the output voltage Vo with the rectified input voltage Vir. By lowering the voltage amplification required when the input voltage is low, the ballast circuit of the present invention achieves a high power factor and is more tolerant of component inaccuracies.

FIG. 4 shows a block diagram of the gain controller 20 of a preferred embodiment of the present invention. The gain controller 20 comprises an oscillator 22 for generating a sequence of square pulses; and a pulse width controller 23 for adjusting the off period width Toff of the sequence of square pulses representing the voltage gain gm of the voltage converter 24. First, the oscillator 22 generates a sequence of square pulses with a fixed pulse width. Then the pulse width controller 23 adjusts the off period width Toff of the sequence of square pulses in respond to the voltage difference between the output voltage Vo and the rectified input voltage Vir (i.e. error voltage) so that the error voltage will remain substantially constant. For example, when the error voltage increases, the off period width Toff will decrease correspondingly. On the other hand, when the error voltage decreases, the off period width Toff will increase correspondingly. Finally, the voltage converter 24 amplifies the rectified input voltage Vir in accordance with the off period time Toff.

FIG. 5a is a timing diagram showing the input voltage Vi and the rectified input voltage Vir of the present invention. In the ideal case, the rectified input voltage Vir should be a constant voltage having an amplitude equal to the peak voltage of Vi.

FIG. 5b is a timing diagram showing the input voltage Vi, the rectified input voltage Vir, and the output voltage Vo of the conventional ballast circuit. The diagram illustrates the key characteristic of the conventional close loop feedback design: the output voltage Vo remains constant notwithstanding changes of the input voltage Vi.

FIG. 5c is a timing diagram showing the input voltage Vi, the rectified input voltage Vir, and the output voltage Vo of the present invention. The diagram illustrates the key characteristic of the "floating" output voltage design of the present invention: instead of maintaining the output voltage Vo constant as in the conventional design, the error voltage (i.e. Vo-Vir) is maintained substantially constant. In other words, the output voltage Vo "floats" with the rectified input voltage Vir.

FIG. 6 shows a schematic diagram of a preferred embodiment of the present invention. The ballast circuit as shown comprises three sections: a rectifier 1, a voltage conversion circuit 2, and an inverter 3. The rectifier 1 is used to convert the input voltage Vi into a rectified input voltage Vir. The rectified input voltage Vir is then fed into the voltage conversion circuit 2 to generate a high output voltage Vo. Finally, the inverter 3 converts the dc high output voltage Vo to a high frequency output voltage Vof to drive the fluorescent lamp.

As shown in FIG. 6, the voltage conversion circuit 2 further comprises: a low voltage power supply 21, a pulse generator 22 for generating a sequence of square pulses, a pulse width controller 23 for adjusting the off period width Toff of the sequence of square pulses in response to the voltage difference between the output voltage Vo and the rectified input voltage Vir, and a voltage converter 24 for the voltage amplification.

Specifically, the main switch transistor Q24, working with the capacitor C21, is used to control the voltage gain for the voltage converter 24. During the off period of the sequence of square pulses, the switch transistor Q21 is switched off so that the capacitor C21 is charged up by the inductor L1-1. Therefore, the longer the off period of the square pulses, the more charge up is the capacitor C21 which in turn generates a higher output voltage Vo. Therefore, the resulting output voltage across the capacitor C21 (i.e. output voltage of the voltage converter 24) is a function of the width of the off period of the sequence of the periodic square pulses (i.e. Toff).

The detail operations of the ballast circuit of the preferred embodiment as shown in FIG. 6 are as follows:

When the gain controller 20 detects an increase in the error voltage (i.e. Vo-Vir) due to a decrease in the input voltage Vir or an increase in the output voltage Vo, the gain controller 20 will reduce the voltage gain gm for the next square pulse cycle by lengthening the off period time Toff provided to the voltage converter 24. During the next pulse cycle, because of the increase in the off period time Toff, the switching transistor Q21 will be shut off for a longer period of time which thereby reduces the time for charging the capacitor C21. The result is a lower output voltage Vo. By reducing the output voltage Vo to compensate the increase of the error voltage, the error voltage (i.e. Vo-Vir) will thereby remain substantially constant.

On the other hand, when the gain controller 20 detects an decrease in the error voltage (i.e. Vo-Vir) due to an increase in the input voltage Vir or a decrease in the output voltage Vo, the gain controller 20 will increase the voltage gain gm for the next square pulse cycle by shortening the off period time Toff provided to the voltage converter 24. During the next pulse cycle, because of the shortening of the off period time Toff, the switching transistor Q21 will be shut off for a shorter period of time which thereby increases the time for charging the capacitor C21. The result is a higher output voltage Vo. By increasing the output voltage Vo to compensate the decrease of the error voltage, the error voltage (i.e. Vo-Vir) will thereby remain substantially constant.

In conclusion, in the "floating" output voltage design of the present invention, the error voltage (i.e. Vo-Vir) is maintained substantially constant so that the ballast circuit's power efficiency remains constant. By maintaining a constant power efficiency, the present invention demands lower rating electronic components and allows better input voltage working range for reliability and stability. The lower components sensitivities of the present invention is important for mass production purposes because the manufacturing costs can be tremendously reduced by not demanding high precision components. In the preferred embodiment, the input voltage can be designed within the range of 100V–260 VAC so that the source current harmonic is varying within 15% and the power factor is about 0.98 and above.

Another aspect of the present invention is the novel design of the conversion circuit 2.

The low voltage power source 21 as shown in FIG. 6 is a single diode rectifier having a zener diode D212 and a capacitor filter for voltage regulation. The power is supplied by the main conductor L2-2. This embodiment has the advantage over the conventional design because when the inverter circuit 3 is shut off due to a power failure, the gain controller 20 will automatically shut off to ensure circuit safety. In the preferred embodiment, the zener diode D212 rated voltage range is from 6V to 20V, and is usually selected from 12V to 15V.

FIG. 7 shows another embodiment of the pulse oscillator 22 and the pulse width controller 23 of the present invention.

In this embodiment, the pulse oscillator 22 comprises an integrated timing circuit, NE555(IC1), for generating the sequence of square pulses. Due to the use of the integrated circuit, the oscillator overall design is greatly simplified. Specifically, the pulse width controller 23 comprises an energy storing inductance L1-2, a limiting resister R236, two clamping diodes D2336, D2138, a voltage limiting zener diode D237, and a trigger capacitor C236. The integrated timing circuit NE555 is low pulse activated so that the polarity of the diode D237's is different from the embodiment as shown in FIG. 6. In this preferred embodiment, the capacitor C236 is around 10 pf.

FIG. 8 shows another embodiment of the voltage converter 24 of the present invention. There are two differences between this embodiment and the embodiment as shown in FIG. 6. First, the locations of the capacitor C242 for the two embodiments are different. In this embodiment, the capacitor C242 is directly charged at the point G. Secondly, the initial voltage of the capacitor C243 is biased by the resistors R244 and R245 whereas the capacitor C243 in the previous embodiment is biased by the resistor R245 alone. Therefore, this preferred embodiment requires a larger resistor R241 to provide the appropriate bias voltage for the normal operation of the voltage converter 24.

FIG. 9 is another embodiment of the voltage converter 24 of the present invention. In this embodiment, the voltage at point G is biased by the resistors R242 and R243. This embodiment requires a smaller capacitor C242 than the embodiment as shown in FIG. 6. The capacitor C242 in this embodiment is around 1 nF whereas the capacitor required in FIG. 6 is around 10 nF.

FIG. 10 shows another embodiment of the voltage converter 24 of the present invention. In this embodiment, the refernce voltage Vref is controlled by adjusting the values of the R241, C241, R247 and R248. For example, in the preferred embodiment as shown, the resistors R243, R246, R244, and R245 are 4.7K, 47K, 470K, and 4.7M respectively. The capacitors C243 and C242 are around 1 uF.

It is to be understood that while the invention has been described above in conjunction with preferred specific embodiments, the description and examples are intended to illustrate and not limit the scope of the invention, which is defined by the scope of the appended claims.

What is claimed is:

1. A ballast system for a fluorescent lamp, comprising:
   a rectifier converting an alternating input voltage to a rectified input voltage;
   a voltage converter converting said rectified input voltage to an output voltage higher than the rectified input voltage according to a voltage gain; and
   an inverter converting said high voltage to a high frequency output voltage;
   said voltage converter being coupled between said rectifier and inverter, and said voltage converter including:
   (a) a voltage generating circuit generating a compensation voltage to adjust said output voltage;
   (b) a switch circuit adjusting the compensation voltage;
   (c) a pulse generating circuit, coupled to said switch circuit and generating a sequence of pulses, wherein widths of the pulses controls switch-on and switch-off time of the switch circuit; and
   (d) a pulse width controlling circuit controlling the widths of the pulses generated by the pulse generating circuit.

2. The ballast system according to claim 1, wherein said voltage converter is responsive to the widths of said sequence of pulses.

3. The ballast system according to claim 1, wherein said widths of the said sequence of pulses are inversely proportional to said voltage difference between said high voltage and said rectified input voltage.

4. The ballast system according to claim 1, wherein the output voltage converted by said voltage converter is at least 180 volts.

5. In use with a ballast system having a voltage converter which includes a voltage generating circuit, a switch circuit, a pulse generating circuit, and a pulse width controlling circuit, a method of providing a high frequency output voltage to a fluorescent lamp, comprising:
   rectifying an alternating input voltage to a rectified input voltage;
   converting said rectified input voltage to an output voltage higher than the rectified input voltage according to a voltage gain;
   adjusting the voltage gain in response to a voltage difference between said output voltage and said rectified input voltage by:
   (a) generating a compensation voltage using the voltage generating circuit;
   (b) adjusting the compensation voltage by turning-on and turning-off the switch circuit;
   (c) generating a sequence of pulses using the pulse generating circuit, wherein widths of the pulses control the turning-on and turning-off of the switch circuit; and
   (d) controlling the widths of the pulses generated by the pulse generating circuit; and
   inverting said output voltage to the high frequency output voltage for the fluorescent lamp.

6. The method according to claim 5, wherein the output voltage is at least 180 volts.

* * * * *

UNITED STATES PATENT AND TRADEMARK OFFICE
CERTIFICATE OF CORRECTION

PATENT NO. : 6,060,844
DATED : May 9, 2000
INVENTOR(S) : Hong-Cheng Chen

It is certified that error appears in the above-indentified patent and that said Letters Patent is hereby corrected as shown below:

On the title page, item [73] Assignee, delete"LapLaz Lighting Co., San Francisco, Calif." and insert --LapLaz Light Co., San Francisco, Calif.--

Signed and Sealed this

Twenty-seventh Day of March, 2001

Attest:

NICHOLAS P. GODICI

Attesting Officer

Acting Director of the United States Patent and Trademark Office